United States Patent [19]
Jespersen

[11] 3,979,710
[45] Sept. 7, 1976

[54] APPARATUS FOR ADJUSTING AND INDICATING THE OPERATING CURVE OF A WEATHER-RESPONSIVE HEATING REGULATOR

[75] Inventor: Aksel Jespersen, Sonderborg, Denmark

[73] Assignee: Danfoss A/S, Nordborg, Denmark

[22] Filed: Feb. 18, 1975

[21] Appl. No.: 550,187

Related U.S. Application Data

[63] Continuation-in-part of Ser. No. 198,159, Nov. 12, 1971, abandoned.

[30] Foreign Application Priority Data
Nov. 16, 1970  Germany............................ 2056253

[52] U.S. Cl. ................................ 338/91; 236/91 F; 338/128; 338/123; 338/196
[51] Int. Cl.². ........................................ H01C 10/00
[58] Field of Search ............ 338/91, 123, 196, 128; 236/91 G, 91 F, 91 R

[56] References Cited
UNITED STATES PATENTS
2,661,906   12/1953   Stahlberg............................ 236/91 F
2,804,269   8/1957   Galavics ............................ 236/91 F FOREIGN PATENTS OR APPLICATIONS
404,926   7/1966   Switzerland

*Primary Examiner*—C. L. Albritton

[57] ABSTRACT

A heating regulator which is responsive to effective outdoor temperatures and the temperature of a heated fluid supplied by a boiler. The regulator has an adjustably positionable pointer which represents a characteristic curve. The regulator includes three slide members with the pointer being pivotally mounted on one of the slide members for a translatory movement therewith and pivotal movement relative thereto. Two potentiometers are operated by two of the slide members and one of the slide members actuates the third slide member which in turn effects pivotal movement of the pointer.

5 Claims, 6 Drawing Figures

APPARATUS FOR ADJUSTING AND INDICATING THE OPERATING CURVE OF A WEATHER-RESPONSIVE HEATING REGULATOR

This application is a continuation-in-part of my now abandoned application Ser. No. 198,159 filed Nov. 12, 1971.

The invention relates to apparatus for adjusting and indicating the operating curve of a weather-responsive heating regulator, comprising a first potentiometer which is adjusted by a manual parallel displacement of the characteristic curve, a second potentiometer which is adjusted by manual varying the steepness of this curve, a characteristic curve-coordinate system and a pointer which indicates the characteristic curve and is displaceable in dependence upon the displacement of the potentiometers.

It is known practice to control the temperature of a heated fluid supplied by a boiler in dependence upon the effective outside temperature. In order to obtain optimum results, the characteristic curve should be adjustable to suit the particular season of the year. This adjustment takes place with the aid of two potentiometers, one of which is responsible for the slope of the characteristic curve and the other for its parallel displacement. It is desirable to represent the characteristic curve visually relative to a printed coordinate system. In the prior art, however, difficulties arise in displacing the pointer in correct relationship with the displacement of the potentiometers.

Swiss Pat. specification No. 404,926 discloses an adjusting apparatus of this kind in which the pointer is mounted on two bearings guided in parallel slots. The bearings can be displaced with the aid of cammed discs. These cammed discs are linked with each other by way of a transmission gear in such manner that when the potentiometer for altering the slope of the characteristic curve is displaced only one of the cammed discs is turned, whereas when the potentiometer for parallel displacement of said curve is displaced, both cammed discs rotate in unison.

The object of the present invention is to provide adjusting apparatus of the initially described kind which, using considerably simpler means, enables the characteristic curve pointer to be altered in correspondence with the displacement of the potentiometers.

According to the invention, this object is achieved by means of a linear slide which is connected to the first potentiometer and on which the pointer is pivotally mounted, and by means of an adjusting element which is connected to the second potentiometer and which turns the pointer. When the first potentiometer is activated, the linear slide is also displaced and the pointer mounted thereon then undergoes parallel displacement. When the second potentiometer is actuated the adjusting element connected to it changes its position, so that the inclination of the pointer changes. The characteristic curve pointer is thus supported in only one bearing. By displacement of the bearing relative to the first potentiometer, and by swinging of the pointer about the bearing relatively to the second potentiometer, a very simple displacement of the pointer is achieved. Complicated transmission gears between two bearings are not required. A very simple construction results if the second potentiometer together with its adjusting element is fitted on the slide.

It is still more advantageous if the linear slide, which displaces the pointer by means of a cammed surface, is also connected to the second potentiometer. Firstly, the second linear slide can be displaced in the same manner as the first linear slide which facilitates inspection. Secondly, with the aid of the cammed surface, any required control relationship between the linear slide and the angle of the pointer can be obtained.

In this connection, it is expedient if the second linear slide is disposed parallel with the first linear slide and, by way of the cammed surface, acts upon a third linear slide which is displaceable at right angles to the other two slides and guides the pointer in a slot parallel with these two other slides. Here, the pointer can be biased by a spring towards that side wall of the slot presented to the cammed surface. When the first slide is displaced, the pointer moves in the slot and therefore parallel with itself. When the third slide is displaced however, the pointer will be engaged by the said side wall of the slot and turned.

A preferred construction comprises a casing part which comprises on one of its sides two tracks for the two first slides and on its other side a track for the third slide and a transverse opening through which extends an element which is connected to the third slide and which bears against the cammed surface of the second slide. A casing part of this kind enables the three slides to be arranged in a space saving manner.

In this construction, the third slide can be constituted by a strip of sheet metal, and the element bearing against the cammed surface by a sheet metal portion bent away from said strip.

Furthermore, a potentiometer can be fitted behind the two first slides on the rear side of the housing part, the contact of each of the potentiometers being carried by a screw which passes through the slide and carries at its front end a lock nut whereby the slide can be held against an element solid with the casing. The screw carrying the contact therefore also serves for immobilizing the slide.

The invention will now be described in more detail by reference to an embodiment illustrated in the drawing, in which.

With reference to the drawings, FIGS. 5 and 6 will be discussed and described first in order to initially provide the environment or background setting for the heating regulator of the present invention.

Figure 5:
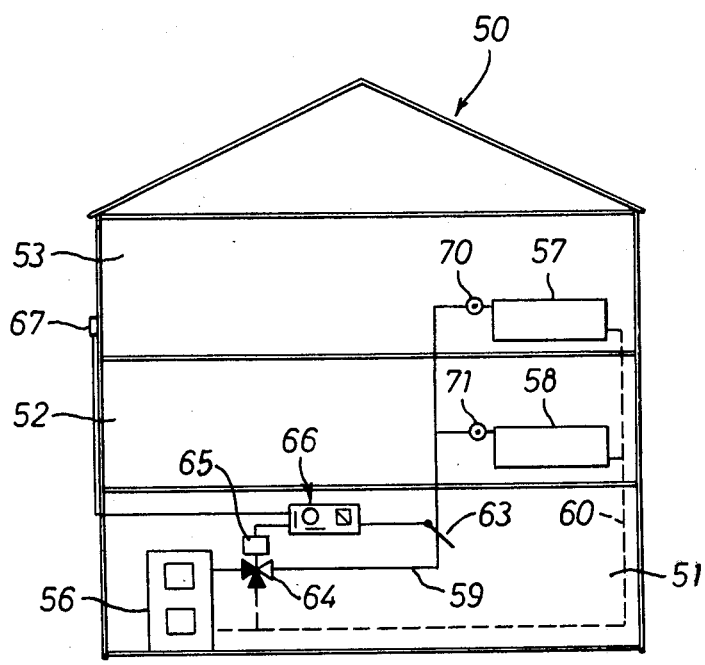
FIG. 5 is a schematic view of a building and the heating sytem thereof to which the invention is applicable.

In FIG. 5 is shown a house or building 50 having a basement 51 and two stories 52 and 53. In the basement is a boiler 56 and on the first and second stories are representative hot water or steam radiators 57 and 58 which are serviced by the boiler through a main line 59 and a return line 60. A sensing device 63 is in the line 50 for sensing the temperature of the fluid flowing in that line. A valve 64 is in the line 59 for regulating the fluid flow therein. A motor 65 operates valve 64.

A heating regulator 66 of the type to which the invention pertains is provided for controlling the valve 64 by operating the motor 65. The sensing device 63 is connected to the regulator 66. Also connected to regulator 66 is a sensing device 67 which is located out-of-doors and primarily is an outdoor temperature sensing device. It is not a part of the invention hereof but the sensing device 67 can also have the characteristic of sensing radiation, wind and humidity and having its value reflect these weather conditions. Basically the sensing devices 63 and 67 involve or include variable electrical resistors which assume resistance values which correspond in a known way to physical values being sensed.

In general the boiler system shown in FIG. 5 operates to control the flow of fluid in the main line 59 to control the BTU's or quantity of heat available to the radiators 57 and 58 which are individually controlled through their valves 70 and 71. Thus in the spring or fall the quantity or BTU's of heat supplied per hour would be substantially less than in winter.

As far as the invention is concerned the sensor 67 has variable resistance values which correspond to various weather conditions. The invention is not concerned with whether a particular resistance value simply represents the outdoor temperature or if it is more sophisticated and represents a composite weather condition made up of the outdoor temperature along with radiation, wind and humidity conditions.

Figure 6:
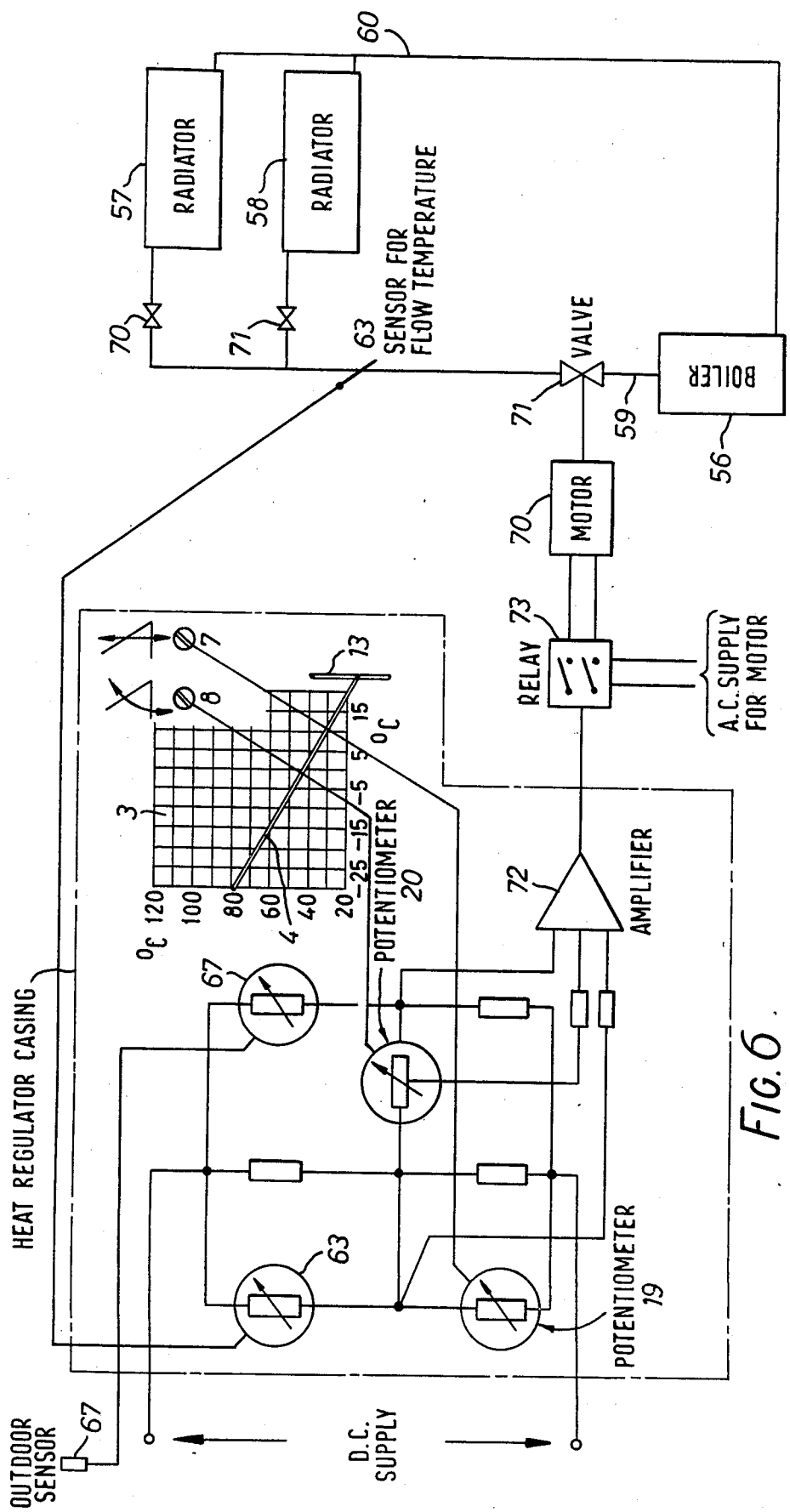
FIG. 6 is a schematic drawing which shows the type of heating system to which the invention is applicable.

FIG. 6 is a schematic drawing which shows the type of heat regulating system to which the present invention is applicable. FIG. 6 only shows the environment for the invention, however, and does not actually disclose the invention itself or any feature of it.

In FIG. 6 there is shown a coordinate system 3 which is shown schematically but which in practice is printed on the casing of a heat regulator unit that embodies the invention. FIG. 6 includes the boiler system shown in FIG. 5. The ordinate represents effective outdoor temperatures and the abscissa represents effective temperatures of the working fluid supplied by the boiler 56 to the supply line 59. A Movable pointer 4 represents the operating characteristics line or "curve" and each setting thereof represents a different correlation between the effective outdoor temperature and the temperature of the working fluid supplied by the boiler. Heating tables are consulted to determine the desired positions for the pointer 4 for different times of the year.

A slot 13 in the casing facilitates the movement of the pointer 4. Two degrees of movement are permitted with the right end of the pointer being movable up and down in the slot 13 and being pivotable about a point at the extreme right end of the pointer. It is explained further on how the loosening and tightening of the screws 7 and 8 facilitate the above referred to "up and down" and "pivotal" movements of the pointer 4.

The pointer 4 thus defines the relationship between the vertical and horizontal variables of the graph and any desired relationship may be obtained by (1) raising or lowering the pointer in a translatory manner or (2) changing the inclination of the pointer by pivoting about either end thereof.

The operator of a heating system, such as a building superintendent, consults heating tables to determine the optimum positions for the pointer 4 for different seasons. On the basis of this information he will set the pointer 4 in a desired position by loosening the screws 7 and 8, moving the pointer to obtain the desired vertical translatory and pivotal movements of the pointer, and then retightening the screws 7 and 8.

The vertical positioning and the inclination of the pointer 4 correspond to settings for two potentiometers 19 and 20 which are integral and essential parts of the regulator. The invention in its most elementary form involves mechanical means for correlating the positions of the pointer with the settings of the potentiometers. In other words, mechanical means are provided so that a manual setting of the pointer 4 will result in corresponding settings for the potentiometers 19 and 20. It is these mechanical means to which the invention is directed as will appear further on.

Another part of the heating system, which is not a part of the invention, comprises the electrical bridge circuit shown in FIG. 6 which includes the potentiometers 19 and 20. The other two resistances in the bridge circuit are, from FIG. 5, the sensing device 63 for sensing the temperature of the fluid in the boiler supply line 59 and the sensing device 67 which senses the "effective" outdoor temperatures. The bridge circuit controls an electric motor 70 which in turn controls a valve 71 in the boiler supply line 59. An amplifier 72 and a relay 73 are provided between the bridge circuit and the valve 71.

Referring to FIGS. 1 to 4 of the drawings, the heating regulator 1 has a cover plate 2 and marked on the cover plate is a coordinate system 3 as described in connection with FIG. 5. The characteristic curve is indicated by a pointer 4. In the cover plate there are provided two slots 5 and 6 through which parallel linear slides 9 and 10 can be displaced after screws 7 and 8 have been loosened. A rectangular opening 11 in cover plate 2 behind which another linear slide 12 containing the slot 13 is located affords passage through the plate 2 for the pointer 4.

Figure 1:
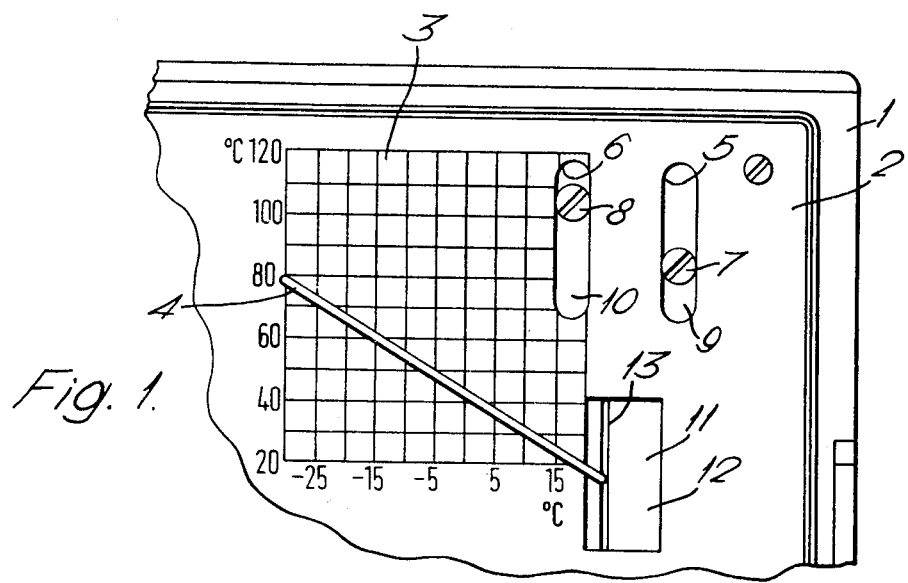
FIG. 1 shows a front view of a portion of the casing of a heating regulator.
Figure 2:
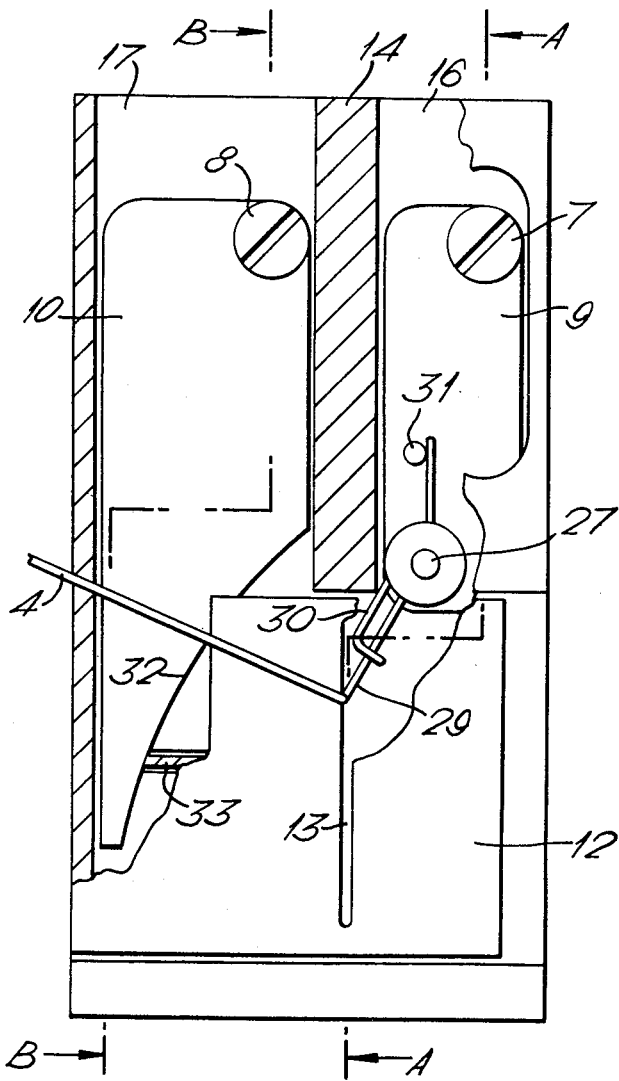
FIG. 2 is a view of the adjusting apparatus of the invention, after removal of the cover plate of the casing.
Figure 3:
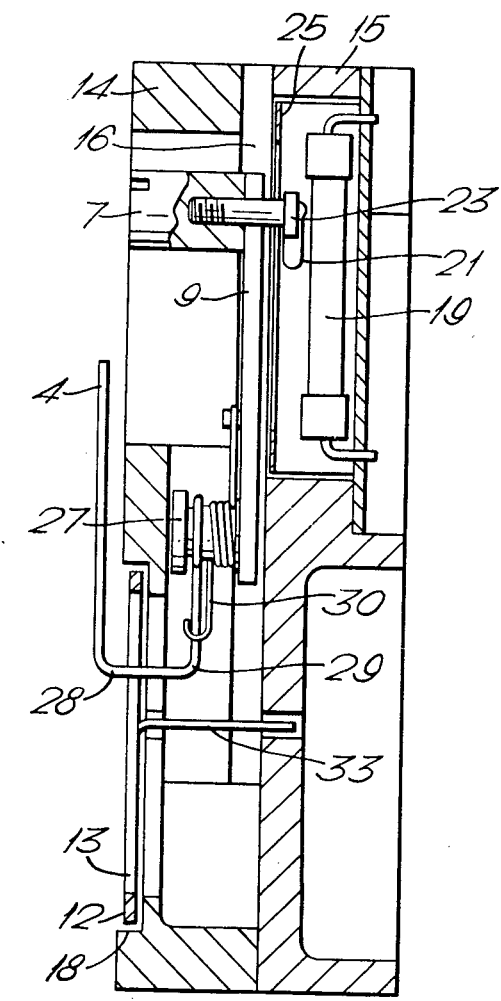
FIG. 3 is a cross section on the line A—A of FIG. 2.
Figure 4:
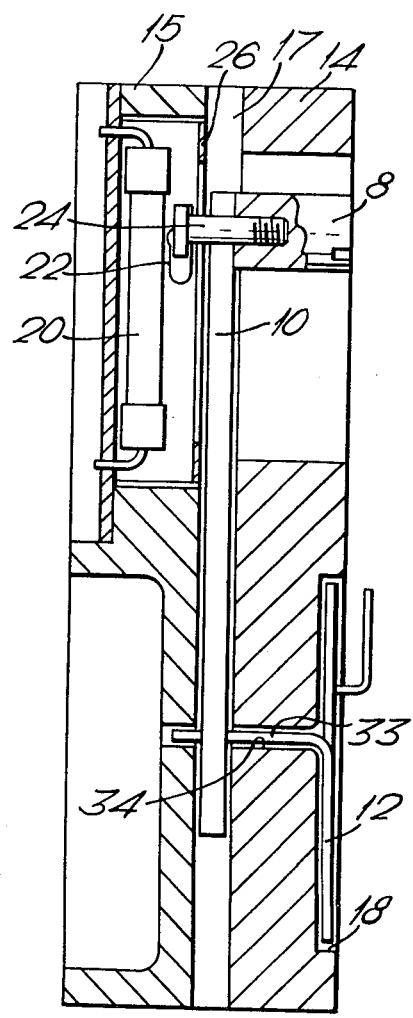
FIG. 4 is a cross section on the line B—B of FIG. 2.

The apparatus behind the cover plate 2 is in the form illustrated in FIGS. 2 and 4. Two superposed casing parts 14 and 15 are provided. The part 14 contains a first track 16 for the first linear slide 9, a second track 17 for the second linear slide 10 and a third track 18 for the third linear slide 12. The casing part 15 accommodates, behind the slides 9 and 10, the potentiometer 19 for the parallel displacement and the potentiometer 20 for changing the slope of the characteristic curve. The respective contacts 21 and 22 are attached to screws 23 and 24 respectively which extend through the slides 9 and 10 respectively and on which are screwed the lock nuts 7 and 8 respectively. By tightening the screws, the associated slides are firmly clamped on elements 25 and 26 respectively which are solid with the housing and which each contain a slot.

Provided on the linear slide 9 is a pivotable bearing 27 for the characteristic curve pointer 4. The pointer 4 is connected to the bearing 27 through a transverse connection 28 and a lever arm 29. A leg spring 30 biases the pointer 4 in the clockwise direction, so that the transverse connection 28 bears against one of the side walls of the slot 13. The free end of the leg spring is held against a stop 31 on the slide 9.

The second linear slide 10 comprises a cammed surface 32 against which there bears an element 33 of the third linear slide 12, under the effect of the force of the spring 30. This element is formed by bending over a part of the third slide 12 made of sheet metal. It extends through an opening 34 into the casing part 14.

The characteristic curve is adjusted in the following manner. First, the lock nut 7 is loosened and the slide 9 is displaced. At the same time the pointer 4 is moved parallel with itself and to that extent to which the contact 21 is moved along the potentiometer 19. The inclination of the pointer is altered by displacement of the second slide 10. As a result of cooperation between the cammed surface 32 and the element 33, this leads to displacement of the third slide 12. Since, as this happens, the slot 13 is also displaced, the pointer 4 pivots about its bearing 27. The change in steepness corresponds to the displacement of the contact 22 on the associated potentiometer 20. This displacement can be conveniently carried out.

I claim:

1. A heat regulating unit for controlling the supply rate of a boiler fluid having a predetermined temperature in accordance with the outdoor temperature to in effect maintain a selected predetermined ratio between said temperatures, comprising, a casing, a coordinate system marked on said casing which represents the relationship between said outdoor temperature and said boiler fluid temperature, a pointer for said coordinate system which represents the characteristic operating curve for said relationship, electric bridge circuit means mounted partially in said casing having two branches for receiving temperature responsive variable resistance resistors for sensing the outdoor temperature and the boiler fluid temperature, first and second potentiometers for the other two branches of said bridge mounted in said casing, first and second slide members mounted for sliding movement in said casing, said pointer being pivotally mounted on said first slide member for translatory movement therewith and pivotal movement relative thereto, said first and second potentiometers having control means operably attached to said slide members with said first potentiometer being controlled in accordance with the indicated level of said pointer and said second potentiometer being controlled in accordance with the slope of said pointer, and means for adjustably positioning said slide members to move said pointer to a desired position which results in imparting desired settings to said potentiometers.

2. A heat regulating unit according to claim 1 including a third slide member mounted for sliding movement in said casing, said third slide member being connected to said pointer for imparting pivotal movement thereto, said third slide member being actuatable by said second slide member.

3. A heat regulating unit according to claim 2 including cam means between said second and third slide members.

4. A heat regulating unit according to claim 2 wherein said third slide member has a slot, said pointer having a portion thereof disposed in said slot, and spring means biasing said pointer in said slot.

5. A heat regulating unit according to claim 2 wherein said casing has track means for said slide members.

* * * * *